US008216506B2

(12) United States Patent
Takakura et al.

(10) Patent No.: US 8,216,506 B2
(45) Date of Patent: Jul. 10, 2012

(54) METHOD OF PROCESSING PLANT

(75) Inventors: Norio Takakura, Kyoto (JP); Takashi Iizuka, Kyoto (JP); Ryohei Kuramatsu, Kyoto (JP)

(73) Assignee: National University Corporation Kyoto Institute of Technology, Kyoto (JP)

( * ) Notice: Subject to any disclaimer, the term of this patent is extended or adjusted under 35 U.S.C. 154(b) by 0 days.

(21) Appl. No.: 12/451,958

(22) PCT Filed: Jun. 4, 2008

(86) PCT No.: PCT/JP2008/060260
§ 371 (c)(1),
(2), (4) Date: Dec. 9, 2009

(87) PCT Pub. No.: WO2008/152955
PCT Pub. Date: Dec. 18, 2008

(65) Prior Publication Data
US 2010/0117266 A1 May 13, 2010

(30) Foreign Application Priority Data
Jun. 11, 2007 (JP) ................................ 2007-154033

(51) Int. Cl.
*B29C 43/52* (2006.01)

(52) U.S. Cl. .................... 264/330; 425/420; 425/405.1; 425/85; 162/396; 162/407; 162/408; 264/109; 264/331.11; 264/126

(58) Field of Classification Search .................. 264/330, 264/109, 331.11, 334, 120, 126; 425/420, 425/405.1, 85, 408; 162/396, 407, 408
See application file for complete search history.

(56) References Cited

U.S. PATENT DOCUMENTS 2,331,296 A * 10/1943 Bendix ........................ 156/382
(Continued)

FOREIGN PATENT DOCUMENTS

JP 08-090516 4/1996
(Continued)

OTHER PUBLICATIONS

Ryuhei Kuramatsu et al., "Hot Pressing of Cups Made from Wood Powder," Proceeding of the 57th Japanese Joint Conference for Technology of Plasticity, Oct. 17, 2006, pp. 299-300 & Partial Eng. translation.

(Continued)

*Primary Examiner* — Joseph Del Sole
*Assistant Examiner* — Nahida Sultana
(74) *Attorney, Agent, or Firm* — Harness, Dickey & Pierce, P.L.C.

(57) ABSTRACT

One embodiment of the present invention includes: a step of setting a piece of a plant containing moisture inside a pressurizing apparatus and hermetically closing the internal space of the pressurizing apparatus; a step of applying a heat and a pressure to the piece of the plant; and a step of (i) enabling ventilation between the inside of the pressurizing apparatus and outside thereof after the piece of the plant reaches a predetermined molding temperature, (ii) retaining the pressure and the temperature for a predetermined period, (iii) cooling a molded article, and (iv) taking out the molded article from the pressurizing apparatus. This realizes a method for processing a plant which method makes it possible to mold a piece of a plant into a desired shape without reducing the piece of the plant into powder and without using an adhesive.

6 Claims, 9 Drawing Sheets

U.S. PATENT DOCUMENTS

| | | | | | |
|---|---|---|---|---|---|
| 2,948,337 | A * | 8/1960 | Wolter | 162/392 |
| 3,259,676 | A * | 7/1966 | Battista et al. | 264/123 |
| 4,111,744 | A * | 9/1978 | Reiniger | 162/100 |
| 4,627,951 | A * | 12/1986 | Shen | 264/109 |
| 5,028,374 | A * | 7/1991 | Imao et al. | 264/517 |
| 5,093,051 | A * | 3/1992 | Reiniger | 264/29.4 |
| 5,264,062 | A * | 11/1993 | Ohsumi et al. | 156/228 |
| 5,338,592 | A * | 8/1994 | Ohsumi et al. | 428/106 |
| 5,366,677 | A * | 11/1994 | Mahanov | 264/113 |
| 5,411,671 | A * | 5/1995 | Bauer et al. | 510/522 |
| 5,624,510 | A * | 4/1997 | Uchida et al. | 156/62.2 |
| 5,855,952 | A * | 1/1999 | Uchida et al. | 427/180 |
| 5,869,138 | A * | 2/1999 | Nishibori | 427/274 |
| 6,066,367 | A * | 5/2000 | Nishibori | 427/274 |
| 6,103,377 | A * | 8/2000 | Clausi | 428/397 |
| 6,638,457 | B2 * | 10/2003 | Inagaki | 264/113 |
| 6,752,910 | B2 * | 6/2004 | Sato et al. | 162/396 |
| 7,704,420 | B2 * | 4/2010 | Stevens et al. | 264/12 |
| 2002/0094444 | A1 * | 7/2002 | Nakata et al. | 428/480 |
| 2005/0145327 | A1 * | 7/2005 | Frankefort et al. | 156/245 |
| 2005/0275138 | A1 * | 12/2005 | Rosen et al. | 264/299 |
| 2006/0261519 | A1 * | 11/2006 | Suzuki et al. | 264/320 |
| 2007/0184238 | A1 * | 8/2007 | Hockaday et al. | 428/98 |
| 2008/0277833 | A1 * | 11/2008 | Chen | 264/331.11 |
| 2009/0130377 | A1 * | 5/2009 | Samanta et al. | 428/113 |
| 2009/0134536 | A1 * | 5/2009 | Kojima et al. | 264/13 |
| 2009/0139678 | A1 * | 6/2009 | Nilsson et al. | 162/226 |
| 2010/0004358 | A1 * | 1/2010 | Hashiba | 524/13 |
| 2010/0009376 | A1 * | 1/2010 | Tomigahara et al. | 435/6 |
| 2010/0117266 | A1 * | 5/2010 | Takakura et al. | 264/330 |
| 2010/0143737 | A1 * | 6/2010 | Chaala et al. | 428/537.1 |
| 2010/0207300 | A1 * | 8/2010 | Johnson | 264/442 |

FOREIGN PATENT DOCUMENTS

| | | |
|---|---|---|
| JP | 10-095003 | 4/1998 |
| JP | 2001-347509 | 12/2001 |
| JP | 2004-291598 | 10/2004 |
| JP | 2006-239918 | 9/2006 |
| JP | 2006-247974 | 9/2006 |
| JP | 2006-327137 | 12/2006 |

OTHER PUBLICATIONS

Ryuhei Kuramatsu et al., "Hot Pressing of Cups Made from Wood Powder," Proceeding of the 57$^{th}$ Japanese Joint Conference for Technology of Plasticity, Oct. 17, 2006, pp. 299-300 + Partial Eng. translation.

International Search Report PCT/JP2008/060260.

* cited by examiner

MATERIAL 15 MINUTES 30 MINUTES 45 MINUTES 60 MINUTES

METHOD OF PROCESSING PLANT

TECHNICAL FIELD

The present invention relates to a method for processing a plant material such as wood.

BACKGROUND ART

There have been known various techniques related to wood processing. Recently, development of environmentally-friendly materials is actively conducted. In particular, botanical resources such as wood greatly attract attention.

Patent Literature 1 discloses an art as below. A plurality of short pieces of wood are arranged and bonded with each other by an adhesive which is softened in a high-temperature water-vapor atmosphere, thereby forming a relatively longer laminated wood. A blank is formed from the laminated wood. The blank is processed by compression molding using a mold under a high-temperature water-vapor atmosphere. According to this technique, the adhesive is softened in the high-temperature water-vapor atmosphere. This allows the plurality of short pieces of wood to make relative displacement therebetween, thereby reducing stress loading. As a result, it is possible to shape the blank, without causing cracking.

Non-Patent Literature 1 discloses a technique by which wood is reduced to powder so that the powder is molded into a desired shape by hot pressing, without the use of an adhesive.

The technique of Patent Literature 1 is not one for deforming wood itself into a desired shape but one by which wood is softened under the high-temperature water-vapor atmosphere so as to be slightly deformed to the extent that no cracking is caused. Moreover, according to the technique, the adhesive is indispensable because the plurality of short pieces of wood are bonded with each other by the adhesive.

On the other hand, the technique of Non-Patent Literature 1 requires a process of reducing wood to powder.

CITATION LIST

Patent Literature 1

Japanese Unexamined Patent Application Publication, Tokukai, No. 2006-327137 A (Publication Date: Dec. 7, 2006)

Non-Patent Literature 1

Ryuhei Kuramatsu et al., "*Hot Pressing of Cups Made from Wood Powder*", the Proceedings of the 57$^{th}$ Japanese Joint Conference for the Technology of Plasticity, p 299-300, Oct. 17, 2006.

SUMMARY OF INVENTION

The present invention was made in view of the problems. An object of the present invention is to realize that method for processing a plant which makes it possible to mold a plant material such as a wood into a desired shape without using an adhesive and without the process of reducing wood to powder.

As a result of diligent study in view of the problems, the inventors of the present invention found that applying a pressure and a heat to a piece of a plant (e.g., a piece of wood) containing moisture while retaining the moisture therein thermally softened the piece of the plant, and thereby gave fluidity such as that of clay to the piece of the plant. This finding led to the present invention which was a totally novel method for processing a plant (e.g., a wood).

A method of the present invention for processing a plant, includes the steps of: (a) fluidizing a piece of a plant containing moisture by applying a pressure and a heat to the piece of the plant while retaining the moisture contained in the piece of the plant; (b) molding the piece of the plant having the fluidity into a molded article having a predetermined shape; (c) removing moisture contained in the molded article made from the piece of the plant; and (d) restoring an ambient pressure and an ambient temperature after the step (c) is carried out, thereby yielding the molded article.

The piece of the plant refers to a chip of a plant material containing cellulose, hemicellulose, and lignin, as its main components, and encompasses any parts of a plant such as a piece of wood, a seed, a root, a stem, and a leaf. It should be noted that the piece of the plant does not mean a plant material reduced to powder.

According to the arrangement, applying the pressure and the heat to the piece of the plant (e.g., a wood) while retaining the moisture gives the fluidity to the piece of the plant. This makes it possible to mold the piece of the plant into a desired shape by plasticity processing, as is the case with clay and metal. Removing the moisture from the piece of the plant having the fluidity and the desired shape deprives the piece of the plant of its fluidity, thereby hardening the piece of the plant. Then, by restoring the ambient pressure and the ambient temperature, it is possible to obtain the hardened molded article molded into the desired shape.

As described above, the present invention makes it possible to mold a plant (e.g., a wood) into a desired shape, without reducing a plant material (e.g., a wood) into powder and without using an adhesive.

This makes it possible to use mill ends of wood or the like which have been disposed as waste, and trees with no usefulness as wood. This greatly contributes to effective use of wood resources.

A method of the present invention for processing a plant, includes: a first step including setting a piece of a plant containing moisture inside a forming mold, hermetically closing inside of the forming mold, and applying a heat and a pressure to the piece of the plant; a second step of enabling ventilation between the inside and outside of the forming mold after the piece of the plant reaches a predetermined molding temperature and a predetermined molding pressure; and a third step including retaining the predetermined molding pressure and the predetermined molding temperature for a predetermined period; cooling a molded article thus made from the piece of the plant; and taking out the molded article from the forming mold.

According to the arrangement too, in the first step, the heat and the pressure are applied to the piece of the plant in the hermetically-closed forming mold. Therefore, the piece of the plant is heated while retaining the moisture therein. This thermally softens the piece of the plant, and thereby gives the fluidity thereto. As a result, the piece of the plant fills in the forming mold.

Then, in the second step, the ventilation between the inside of the forming mold and the outside thereof is enabled after the piece of the plant reaches the predetermined molding temperature and the predetermined molding pressure. This removes the moisture contained in the piece of the plant, thereby depriving the piece of the plant of its fluidity. Specifically, the piece of the plant starts to harden while retaining its shape along the forming mold. After the pressure (molding pressure) and the temperature (molding temperature) are retained for the predetermined period, the molded article is cooled. Then, the molded article is taken out from the forming mold. The molded article molded into the desired shape can be obtained in this manner.

As described above, the present invention makes it possible to mold a plant into a desired shape, without reducing the plant into powder and without using an adhesive.

The moisture content of the piece of the plant is preferably not less than 10% by weight. This makes it possible to easily give the fluidity to the piece of the plant by the application of the pressure and the heat. As a result, the piece of the plant can be easily molded even into a complex shape.

In addition, the pressure applied to the piece of the plant is preferably 100 MPa or greater. This makes it possible to easily give the fluidity to the piece of the plant by the application of the pressure and the heat. As a result, the piece of the plant can be easily molded even into a complex shape.

Furthermore, the piece of the plant is preferably heated to a temperature not less than 130° C. but not more than 200° C. This makes it possible to easily give the fluidity to the piece of the plant by the application of the pressure and the heat. As a result, the piece of the plant can be easily molded even into a complex shape.

REFERENCE SIGNS LIST

Figure 1:
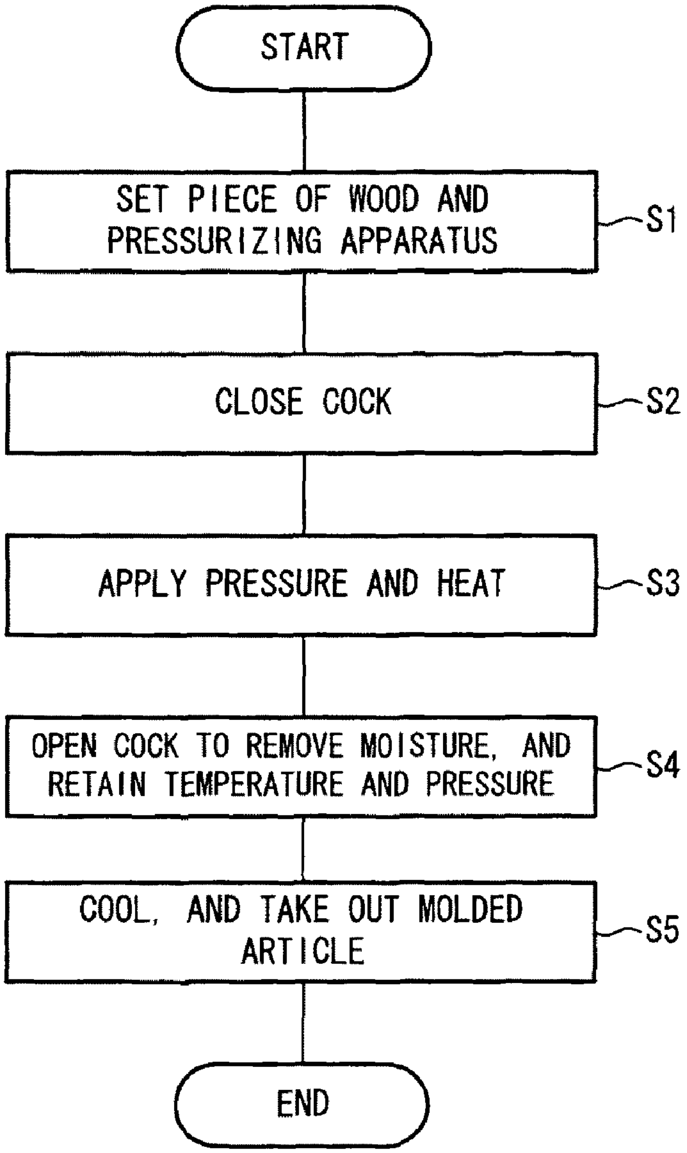
FIG. 1 is a flowchart showing a flow of a method of one embodiment of the present invention for processing wood.

1 Pressurizing apparatus (forming mold)
2 Pressurizer
3 Outer mold
4 Open/close cock
5 Closing mold (forming mold)
6 Upper punch
7 Two mold halves
8 Lower punch
9 and 9' Shaping mold (forming mold)
10 Piece of wood (piece of a plant)
11 Grain

DESCRIPTION OF EMBODIMENTS

The following describes a method of one embodiment of the present invention for processing a plant, with reference to FIGS. 1 through 9.

The present embodiment deals with a totally novel method for processing a piece of a plant with a view to a previously unknown property of a plant, i.e., with a view to the fact that a piece of a plant is thermally softened by pressure and heat application thereto while retaining moisture in the piece of the plant, whereby the softened piece of the plant obtains fluidity such as that of clay. The "piece of a plant" is referred to as a chip of a plant. The "piece of a plant" does not mean a plant material reduced to powder.

(Processing Object)

A plant material contains cellulose, hemicellulose, and lignin, as its main components. The components are those constituting a cell of a plant. The following shows component content percentages of wood (see Takeshi SADOU, *Mokuzai Kougaku* (Timber Engineering), published by Yokendo).

Broad-leaved trees: hemicellulose 20% to 25%; lignin 20% to 25%; cellulose 45% to 50%

Needle-leaved trees: hemicellulose 15% to 20%; lignin 25% to 30%; cellulose 45% to 50%

As shown above, main components of a plant are cellulose, hemicellulose, and lignin, and a total of their content percentages reaches over 90%. Accessory components other than the main components are ash content, resin, essential oil, tannin, pigment, and nitrogen-containing compounds.

A piece of a plant has the property above of being thermally softened and thereby obtaining the fluidity as that of clay, due to the main components of a plant cell: cellulose, hemicellulose, and lignin. Therefore, the present invention is applicable to a plant material containing cellulose, hemicellulose, and lignin, as its main components. In other words, in the present embodiment, "a piece of a plant" encompasses any parts of a plant such as a piece of wood, a seed, a root, a stem, and a leaf. For example, "a piece of a plant" encompasses chaff and the like.

The following deals with the embodiment, for a case where a piece of wood is used as the piece of the plant. However, in the present invention, the piece of the plant is not limited to the piece of wood, provided that it is a chip of a plant. Needless to say, material properties of the piece of wood, which are described below, do not depend on wood species. That is, it is possible to use pieces of wood such as chips of various woods, e.g., Japanese cedar, pine tree, cypress, etc.

(Pressurizing Apparatus)

As described below, in the present embodiment, a closing mold is hermetically closed so that moisture within the piece of wood does not escape therefrom, while the piece of wood is heated to a predetermined molding temperature. When the predetermined molding temperature is reached, the closing mold is opened so that the moisture escapes from the piece of wood. For this reason, a pressurizing apparatus used in the present embodiment includes the closing mold having an open/close cock.

Figure 2:
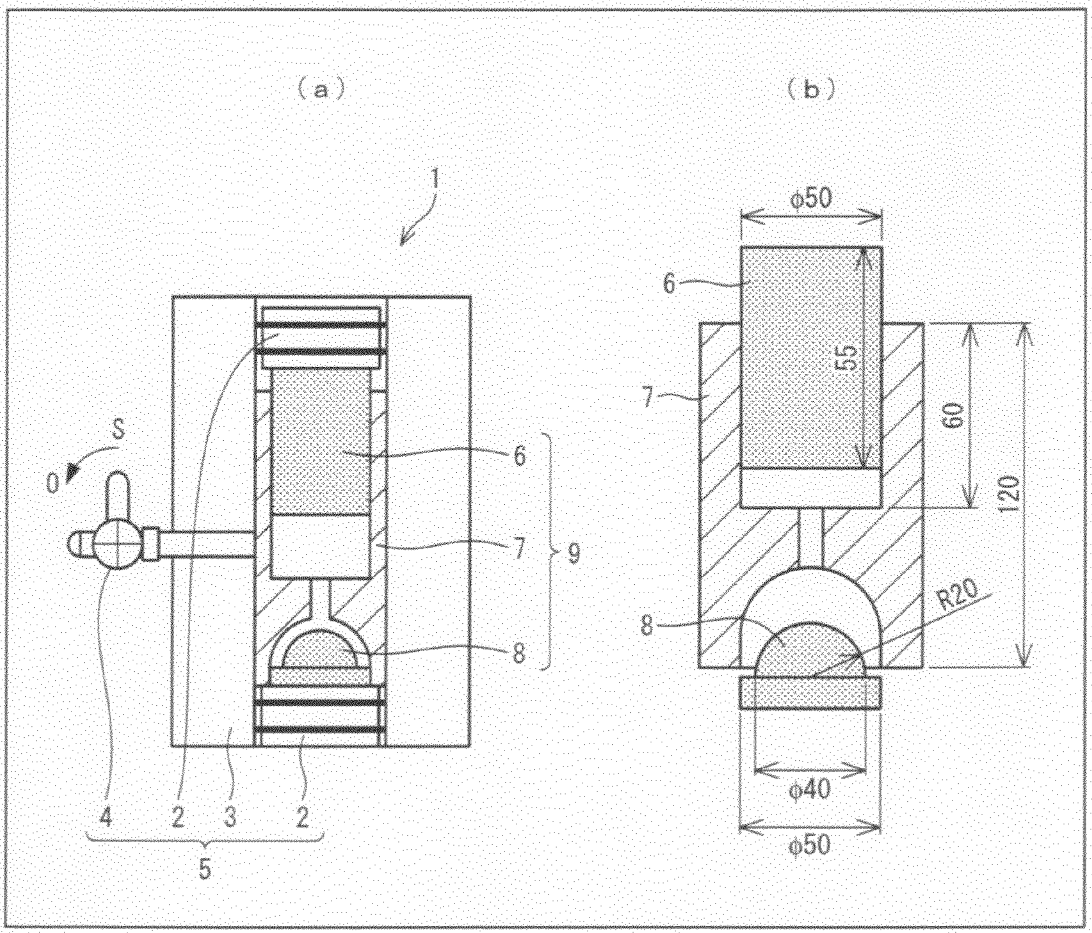
FIG. 2 is a view illustrating an example of a pressurizing apparatus used in the embodiment of the present invention. (a) of FIG. 2 is a cross-sectional view illustrating the whole of the pressurizing apparatus. (b) of FIG. 2 is a cross-sectional view illustrating a shaping mold provided in the pressurizing apparatus.

(a) and (b) of FIG. 2 are each a view illustrating one example of the pressurizing apparatus used in the present embodiment. A pressurizing apparatus 1 includes (i) the closing mold 5 which can be hermetically closed, and (ii) a shaping mold 9 for shaping the piece of wood into a desired shape. The shaping mold 9 is provided inside the closing mold 5.

The closing mold 5 includes (i) a cylindrical outer mold 3, (ii) two disk-shaped pressurizers 2 each having a diameter which is slightly smaller than an interior diameter of, the outer mold 3, and (iii) an open/close cock 4 for enabling and disabling ventilation between an internal hollow portion of the outer mold 3 and an outer space.

One of the two pressurizers 2 is fitted in the outer mold 3 from above while the other one is fitted therein from below. An O-ring is attached to a sidewall of each of the two pressurizers 2. When the open/close cock 4 is closed, the arrangement makes it possible to hermetically close a space enclosed by the outer mold 3 and the two pressurizers 2. Opening the open/close cock 4 enables the ventilation between the space and the outer space.

The shaping mold 9 is used to mold the piece of wood into a desired shape, and has a shape in accordance with the desired shape. (b) of FIG. 2 illustrates one example of the shaping mold 2, for a case where the piece of wood is molded into a shape like a wine glass. The unit of measurements is millimeter in (b) of FIG. 2. As illustrated in (b) of FIG. 2, in this case, the shaping mold 2 includes two mold halves 7, an upper punch 6, and a lower punch 8.

In the pressurizing apparatus 1, the shaping mold is provided inside the outer mold 3, and the two pressurizers 2 are fitted in the outer mold 3 so as to sandwich the shaping mold 9. A pressure is applied by a pressing machine to the two pressurizers 2 from above and below, thereby molding the piece of wood.

(Processing Method)

Figure 3:
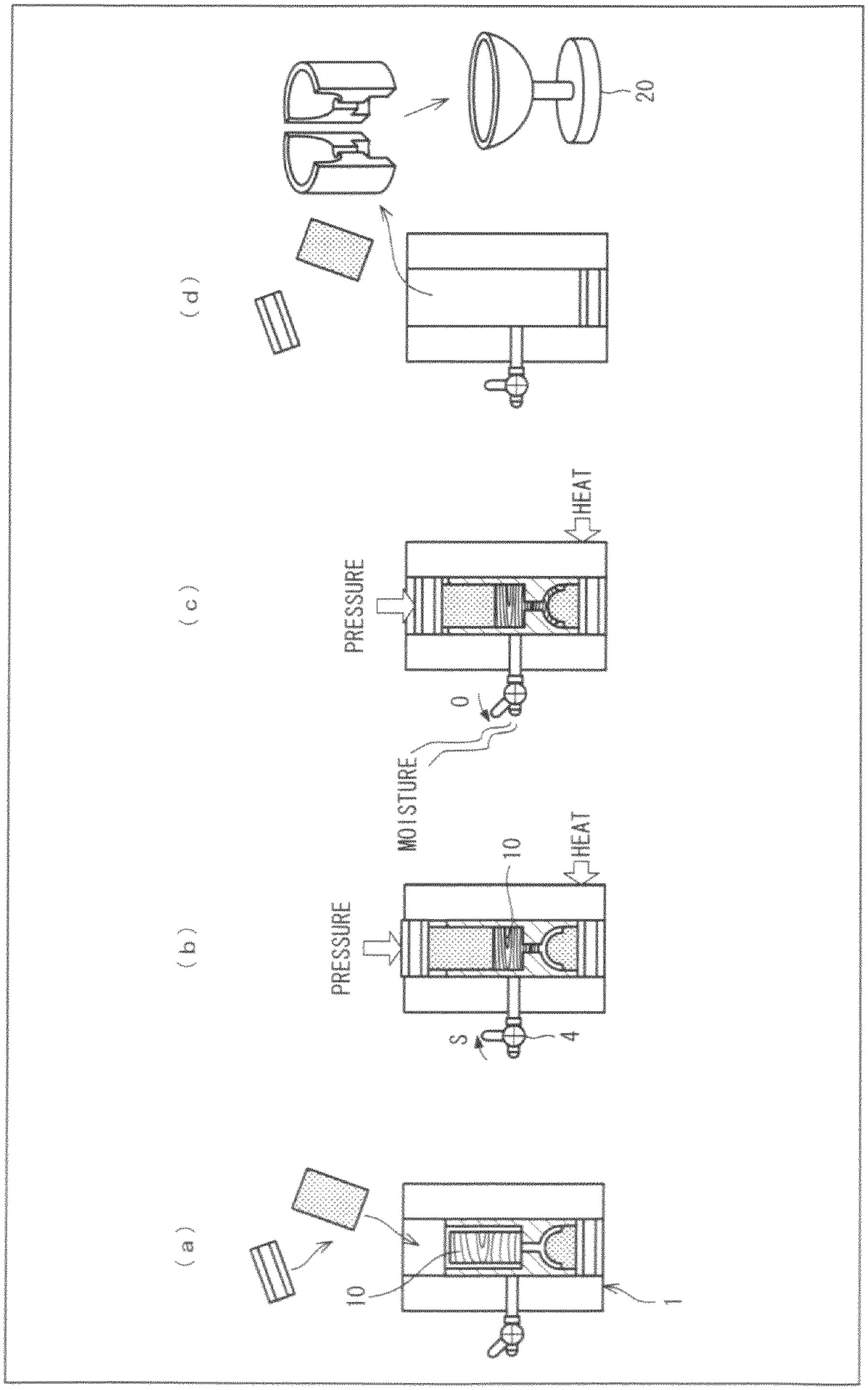
FIG. 3 is a view illustrating steps of the method of the embodiment of the present invention for processing wood. (a) through (d) of FIG. 3 illustrate S1, S2 and S3, S4, and S5, respectively.

The following describes a method of the present embodiment for processing a plant. FIG. 1 is a view showing a flow of the method of the present embodiment for processing a plant material (i.e., a wood in the present embodiment). FIG. 3 is a view illustrating respective states of steps shown in FIG. 1.

As shown in FIGS. 1 and 3, a piece of wood 10 is set in the pressuring apparatus 1 (Step (hereinafter, referred to as S) 1). A volume of the piece of wood 10 to be set is determined in consideration of a desired volume and a desired compression ratio which are obtained after pressure shaping is performed.

The piece of wood 10 to be set is processed in advance so as to have a predetermined moisture content (e.g., 10%). In the present Description, moisture content is referred to as dry-basis moisture content. The moisture content is found by the following equation:

$$\text{Moisture content (\%)}=(W1-W0)/W0\times 100$$

where: W0 is a total dry weight (i.e., a weight measured after a constant mass is reached by drying at a temperature from 100° C. to 105° C.) of a sample; and W1 is a weight of the sample including moisture.

When left standing under a certain temperature and a certain humidity, a moisture content of the piece of wood 10 changes accordingly, and stops changing. Moisture content which equilibrates with a normal atmospheric temperature and a normal humidity is referred to as air-dried moisture content. In order that the piece of wood 10 has a moisture content smaller than an air-dried moisture content, the piece of wood 10 is left in a dry state (i.e., in a space with an air blow at 110° C.). In order that the piece of wood 10 has a moisture content larger than the air-dried moisture content, the piece of wood 10 is soaked in boiling distilled water until the boiling distilled water is cooled down to its ambient temperature. Then, the piece of wood 10 is left standing in the dry state (in the space with the air blow at 110° C.) until the piece of wood 10 has a desired moisture content. Thus, it is possible to obtain the piece of wood 10 having the desired moisture content.

Then, the open/close cock 4 is closed (S2).

Then, as shown in FIG. 1 and (b) of FIG. 3, under a predetermined molding pressure (e.g., 100 MPa), the pressurizing apparatus 1 is heated (S3) until a predetermined molding temperature (e.g., 160° C.) is reached in the pressurizing apparatus 1. As illustrated in (b) of FIG. 3, this thermally softens the piece of wood 10, and thereby gives the fluidity thereto. As a result, the piece of wood 10 starts to deform along the surface shape of the shaping mold 9. The deformation can be confirmed by observing a stroke of the upper pressurizer 2. That is, the stroke greatly varies in S3. Particularly, the fluidity arises when the pressurizing apparatus 1 has an internal temperature of approximately 100° C.

The correlation between an internal temperature of the pressurizing apparatus 1 and a temperature of the outer mold 4 is found in advance through an experiment. On the basis of the result of the experiment, it is possible to determine an internal temperature of the pressurizing apparatus 1 by measuring a temperature of the outer mold 4.

As illustrated in (c) of FIG. 3, the open/close cock 4 is opened when the predetermined molding temperature is reached inside the pressurizing apparatus 1, and the predetermined molding pressure and the predetermined molding temperature are retained during a predetermined retention period t2 (S4). This causes the moisture contained in the piece of wood 10 to discharge therefrom. This deprives the piece of wood 10 of its fluidity. As a result, the piece of wood 10 starts to harden, while preserving its shape formed along the shaping mold 9.

An open period t1 from the closing of the open/close cock 4 (S2) to the opening thereof is set as suitable according to how large the pressurizing apparatus 1 is and how high the molding temperature is. In a case where the pressurizing apparatus 1 illustrated in (a) and (b) of FIG. 2 is used, the open period t1 is 65 minutes for example.

The retention period t2 is also set as suitable according to a size of a molded article. In a case where the pressurizing apparatus 1 illustrated in (a) and (b) of FIG. 2 is used, the retention period t2 is 60 minutes for example.

Then, the application of the pressure and the heat is ended. After cooled down to an ambient temperature, the pressurizing apparatus 1 is dismantled as illustrated in (d) of FIG. 3 so that a molded article 20 is taken out (S5).

As described above, the pressure and the heat are applied to the hermetically-closed pressurizing apparatus 1. Therefore, the piece of wood 10 containing the moisture reaches a softening temperature. The piece of wood 10 thus fluidized fills every corners of the shaping mold 9. Then, a pressure is applied to the pressurizing apparatus 1 while the moisture is removed by opening the open/close cock 4. As a result, a molded article can be obtained satisfactorily. If the open/close cock 4 is opened during the heating, the moisture evaporates. This results in an insufficient fluidity of the piece of wood 10.

(Evaluation 1 of Molded Article: Hardness and Density)

Measured were Vickers hardnesses and densities of a molded article. The molded article was made from a piece of Japanese cedar (hereinafter, referred to as piece of wood) containing an air-dried moisture content of approximately 10%, by the pressurizing apparatus 1 illustrated in (a) and (b)

of FIG. 2. Conditions for molding the molded article to be measured were: molding pressure=100 MPa; molding temperature=160° C.; open period t1=65 minutes; and retention period t2=10 minutes.

Figure 4:
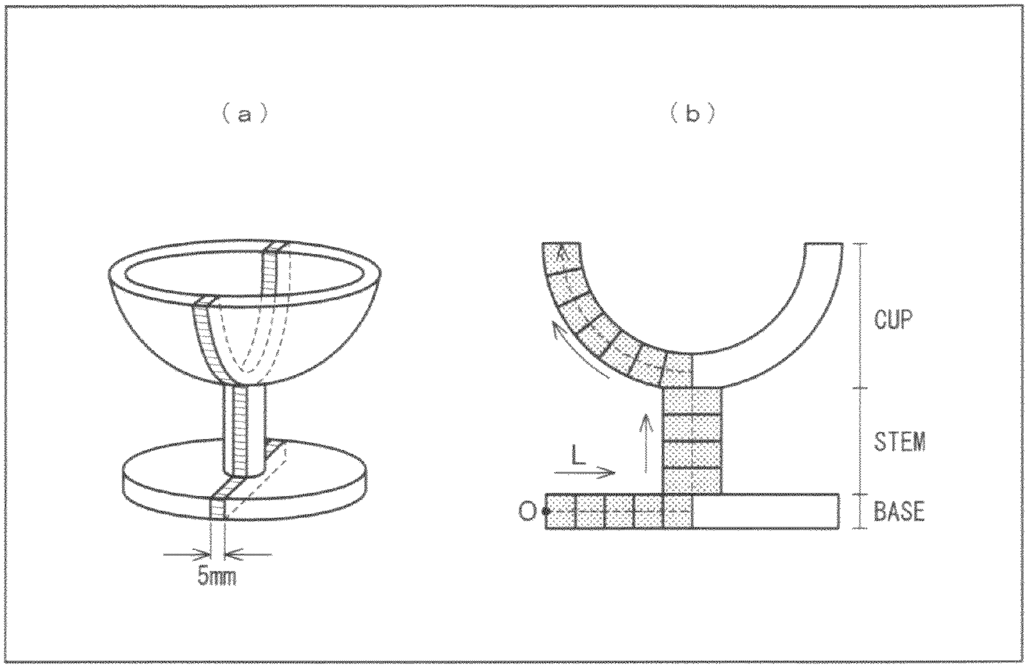
FIG. 4 is a view showing positions at which Vickers hardnesses and densities of a molded article are measured. (a) of FIG. 4 is a view showing which part of the molded article is cut out for the measurement. (b) of FIG. 4 is a view showing the measurement positions on the part cut out from the molded article.

(a) and (b) of FIG. 4 illustrate measurement positions. As illustrated in (a) of FIG. 4, a 5 mm-thick part was cut out from the molded article in order that a central cross-section thereof might be obtained. After the central cross-section was grinded by a 1000-grit sandpaper, Vickers hardnesses were measured. As illustrated in (b) of FIG. 4, the Vickers hardnesses of the central cross-section of the molded article were measured from the point O in the L direction at intervals of 1 mm. As shown in (b) of FIG. 4, three parts of the molded article having the shape like a wine glass are referred to as a base, a stem, and a cup. The piece of wood flows through the three parts in order of the base, the stem, and the cup.

Figure 5:
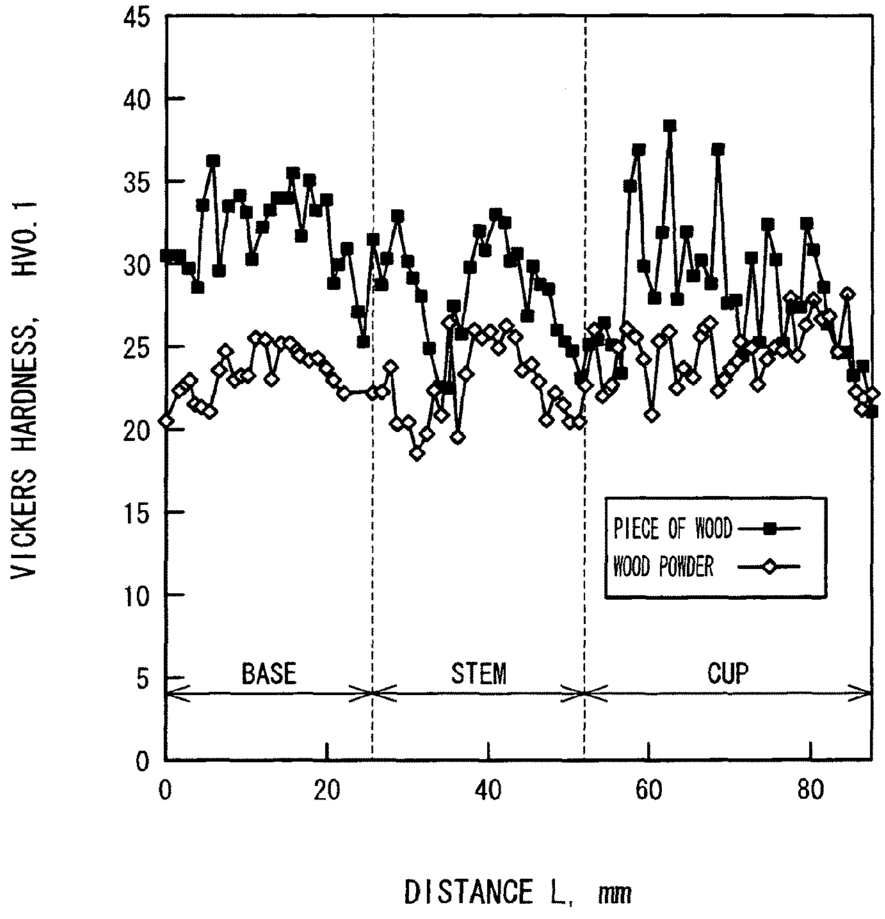
FIG. 5 is a graph showing results of measurement of the Vickers hardnesses.

FIG. 5 is a graph showing the results of measurement of the Vickers hardnesses. In FIG. 5, the horizontal axis represents distances from the point O along the L direction (see (b) of FIG. 4). For comparison, FIG. 5 also shows results of measurement of Vickers hardnesses of a molded article obtained by molding wood powder (particle diameter: 300 μm or less) of the same wood under the same molding conditions.

As shown in FIG. 5, the molded article made from the piece of wood had an average Vickers hardness of 29.4HV0.1. On the other hand, the molded article made from the wood powder had an average Vickers hardness of 24.1HV0.05. The results showed that the molded article made from the piece of wood was slightly harder than that made from the wood powder.

In addition, the 5 mm-thick part, which was cut out for the Vickers hardness measurement, was divided into pieces at intervals of 5 mm. Then, each of the pieces was measured in density.

Figure 6:
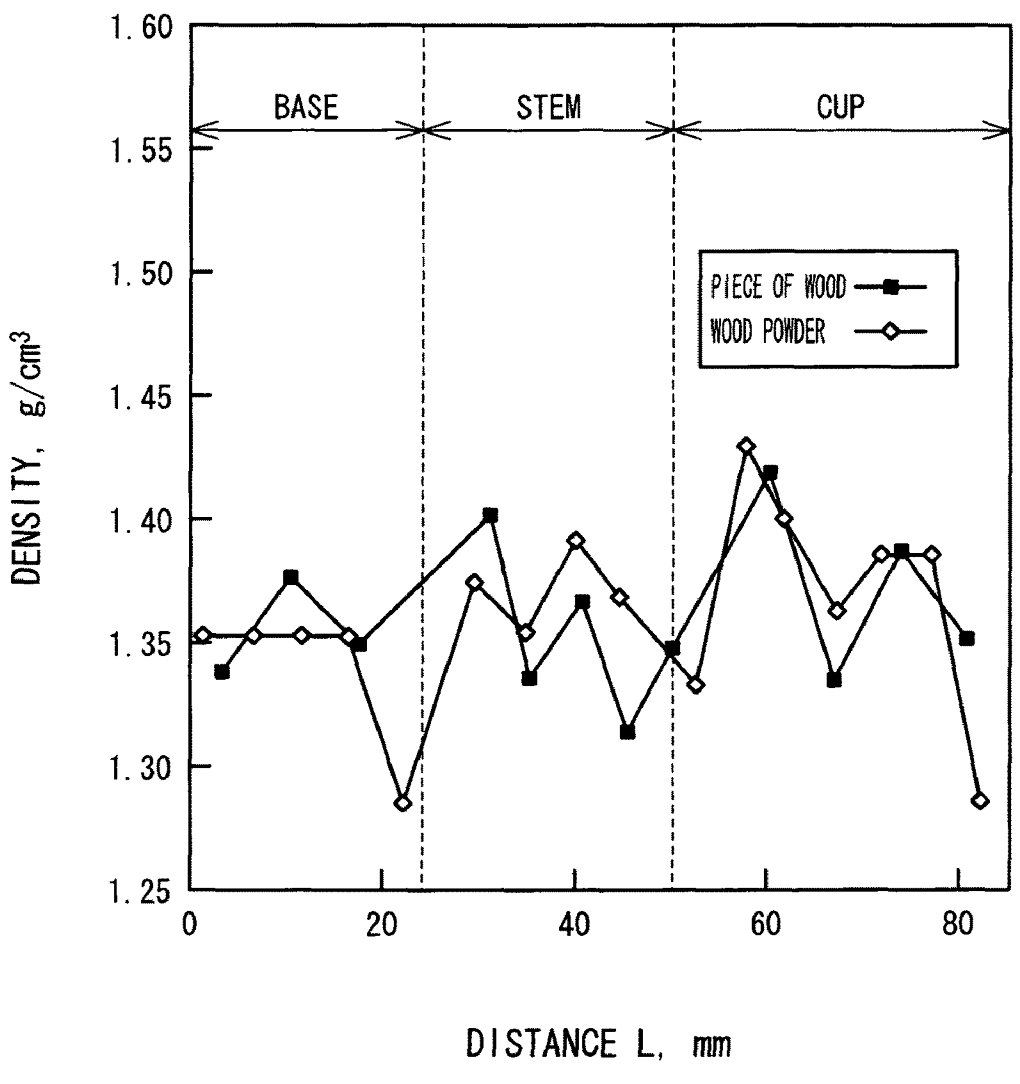
FIG. 6 is a graph showing results of measurement of the densities.
Figure 7:
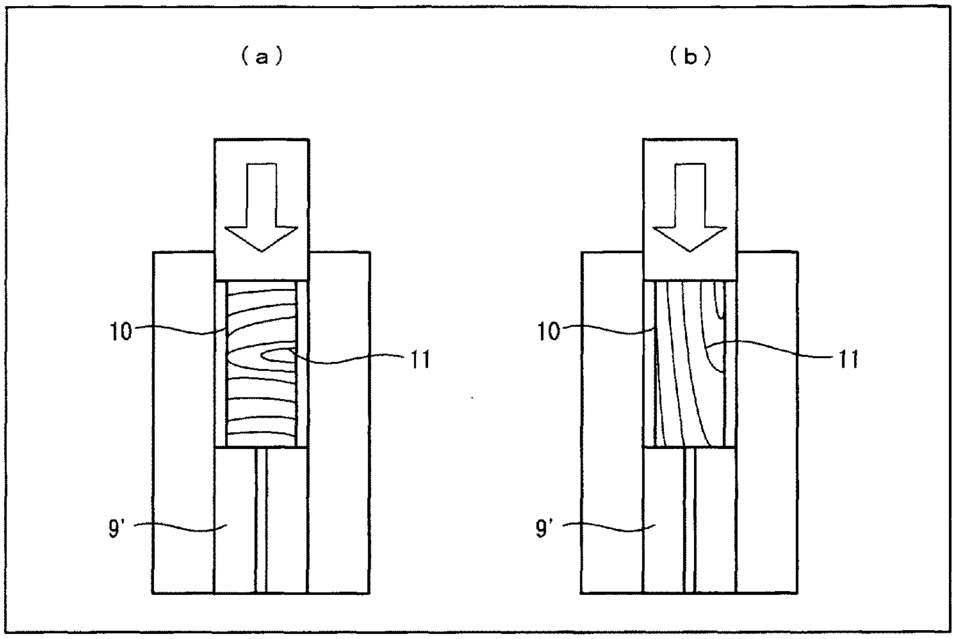
FIG. 7 is a view illustrating a mold and a piece of wood which are used to mold a molded article to be used in a three-point bending test. (a) of FIG. 7 is a view illustrating a state in which one piece of wood is set so that its grain is substantially perpendicular to an axial direction of a cylindrical hollow portion of the shaping mold. (b) of FIG. 7 is a view illustrating a state in which the piece of wood is set so that its grain is substantially perpendicular to the axial direction of the cylindrical hollow portion of the shaping mold.

FIG. 6 is a graph showing results of measurement of the densities. In FIG. 6, the horizontal axis represents distances from the point O along the L direction (see (b) of FIG. 4). As shown in FIG. 6, an average density was approximately 1.36 g/cm$^3$. The molded article made from the piece of wood and that made from the wood powder did not differ in average density. That is, the results showed that a molded article having a high density could be made also from a piece of wood.

The base, the stem, and the cup hardly differed in both Vickers hardness and density. Each of the three parts tended to be slightly smaller in Vickers hardness and density at its edge than at the other parts. It appears that this is because the piece of wood greatly moved near a boundary between two of the parts, and greatly flowed out between the two mold halves. However, still, it was confirmed that obtained was a molded article which was high and stable in hardness and density as a whole.

(Evaluation 2 of Molded Article: Three-Point Bending Test)

Then, a three-point bending test was conducted on a cylindrical molded article having a diameter of 5 mm and having been molded under the same molding conditions as those of the Evaluation 1 of Molded Article. The cylindrical molded article can be obtained by using a shaping mold 9' having a cylindrical internal hollow portion as illustrated in (a) and (b) of FIG. 7.

In the measurement, the following three molded articles were used as samples: (i) a molded article made from wood powder (Comparative Example); (ii) a molded article obtained, as is illustrated in (b) of FIG. 7, by molding the piece of wood 10 set so that its grain 11 was substantially parallel with an axial direction of the cylindrical hollow portion of the shaping mold 9' (Example 1); and (iii) a molded article obtained, as is illustrated in (a) of FIG. 7, by molding the piece of wood 10 set so that its grain 11 was substantially perpendicular to the axial direction (Example 2).

Figure 8:
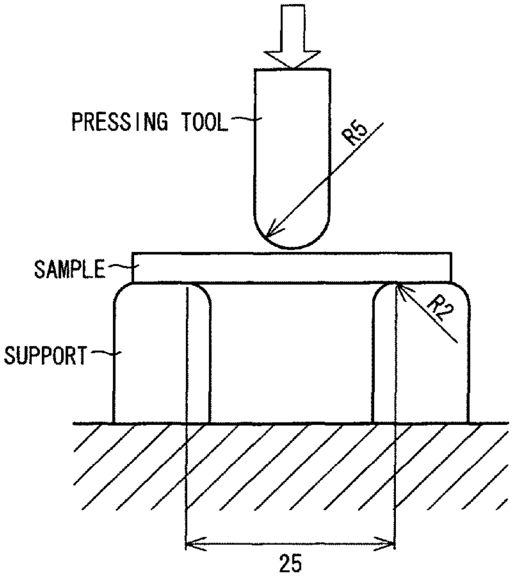
FIG. 8 is a view illustrating test conditions of the three-point bending test.

Test conditions of the three-point bending test are as illustrated in FIG. 8. The unit of measurement is millimeter in FIG. 8.

Figure 9:
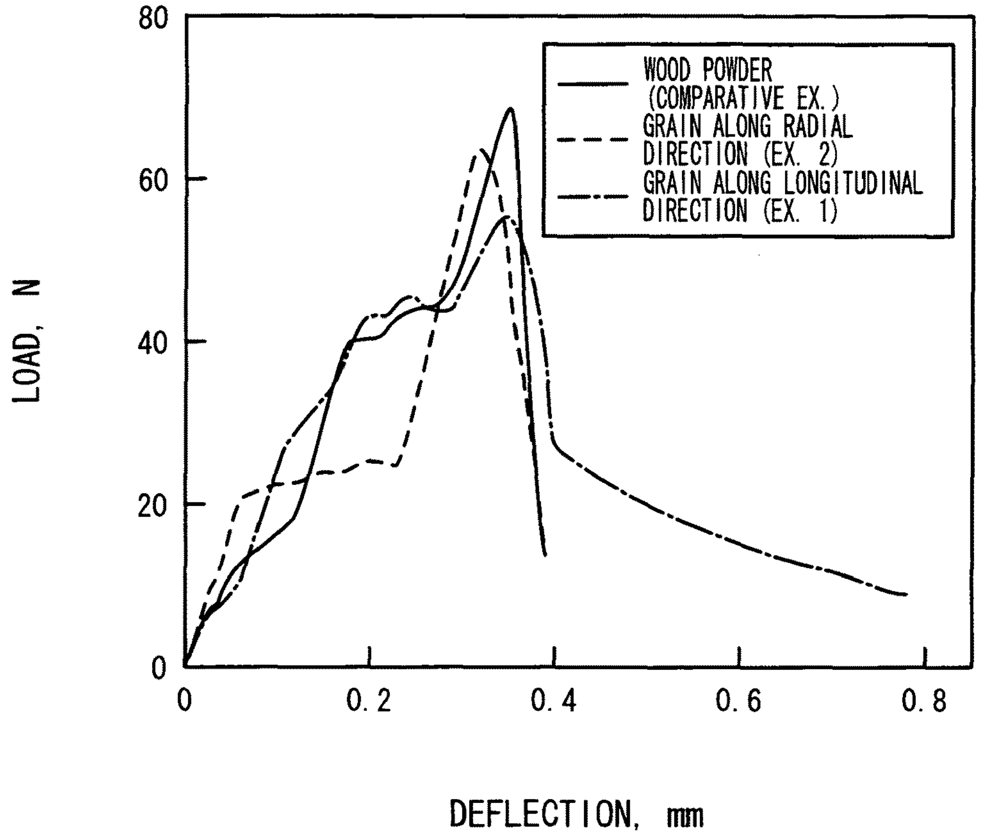
FIG. 9 is a graph showing results of the three-point bending test.

FIG. 9 is a graph showing load-deflection curves plotting results of the three-point bending test. As shown in FIG. 9, the three molded articles of Comparative Example and Examples 1 and 2 could be deflected by substantially the same amount of deflection. Further, it was found that every molded article showed its largest deflection when subjected to a load of 50N or higher.

(Fluidity of Piece of Wood)

Figure 10:
FIG. 10 is a view showing a fluid behavior of the piece of wood.

Under a molding pressure of 120 MPa and a molding temperature of 160° C., a molded article was made from a piece of Japanese cedar (hereinafter, referred to as piece of wood) containing an air-dried moisture content of approximately 10%, by the pressurizing apparatus 1 illustrated in (a) and (b) of FIG. 2. During the molding, a temporal change in shape of the molded article was observed at each of the following elapsed times: 15, 30, 45, and 60 minutes. FIG. 10 is a view showing the temporal change in shape of the molded article. That is, FIG. 10 shows a fluid behavior of the piece of wood, for a case where the piece of wood was molded under the following molding conditions of: a moisture content of approximately 10%; a molding pressure of 120 MPa; and a molding temperature of 160° C. As shown in FIG. 10, the piece of wood flowed through the base, the stem, and further, the cup of the molded article having the shape like a wine glass in this order, with increase in elapsed time, i.e., with increase in elapsed time during which the piece of wood was kept under the molding conditions above. The fluid behavior varies depending on molding conditions.

(Molding Conditions)

A high moisture content leads to a good fluidity. This makes it possible to fill every corners of the shaping mold with the piece of wood even if a molding pressure is low. As is the case with this, a moisture content, a molding pressure, and a molding temperate can be freely set, provided that the fluidity of the piece of wood can be secured.

The inventors of the present invention confirmed that the following molding conditions: a moisture content of not less than 10%; a molding pressure of not less than 100 MPa; and a molding temperature of not less than 130° C. but not more than 200° C. allowed the piece of wood to have a fluidity sufficient for molding of a complex shape, and the molding conditions made it possible to obtain a molded article which was stable in hardness and density.

A moisture content lower than 10% can increase a required molding pressure and can cause an insufficient fluidity. In contrast, a high moisture content such as that higher than 30% increases the fluidity of the piece of wood. This increases moisture contained in the molding object. As a result, the molding object can have shrinkage cracking after the open/close cock 4 is opened. In this case, it is possible to take a countermeasure such as increasing the retention period t2.

A molding pressure lower than 100 MPa can cause insufficient filling of the piece of wood in a shaping mold having a complex shape.

In addition, a molding temperature lower than 130° C. is insufficient to give the fluidity to the piece of wood. On the other hand, a molding temperature higher than 200° C. causes the thermal decomposition of the piece of wood. As a result, a good molded article cannot be obtained.

Although the above deals with an example using the piece of wood, the inventors of the present invention also confirmed that a good molded article could be obtained by processing even a piece of a plant (e.g., chaff) except pieces of wood under the same conditions as those for processing the piece of wood.

As described above, a method of the present embodiment for processing a plant, includes the steps of: (a) fluidizing the piece of wood 10 (a piece of a plant) containing moisture by applying a pressure and a heat to the piece of wood 10 while retaining the moisture contained in the piece of wood 10; (b) molding the piece of wood 10 having the fluidity into a molded article having a predetermined shape; (c) removing moisture contained in the molded article made from the piece of wood 10; and (d) restoring an ambient pressure and an ambient temperature after the step (c) is carried out, thereby yielding the molded article.

More specifically, the method for processing a plant, includes: a step (S2) including setting the piece of wood 10 containing the moisture inside the pressurizing apparatus (forming mold) 1, and hermetically closing the internal space of the pressurizing apparatus 1; a step (S3) of applying a heat and a pressure to the piece of wood 10; a step (S4) including enabling ventilation between the inside of the pressurizing apparatus 1 and outside of the pressurizing apparatus 1 after the piece of wood 10 reaches a predetermined molding temperature, and retaining the pressure and the temperature for a predetermined period; and a step (S5) including cooling a molded article thus made from the piece of wood 10, and taking out the molded article from the pressurizing apparatus 1.

Applying a pressure and a heat to the piece of wood 10 while retaining the moisture gives the fluidity to the piece of wood 10 which is a piece of a plant. This makes it possible to mold the piece of wood 10 into a desired shape by plasticity processing, as is the case with clay and metal. Then, removing the moisture from the piece of wood 10 having the fluidity and the desired shape deprives the piece of wood 10 of its fluidity, thereby hardening the piece of wood 10. Then, by restoring the ambient pressure and the ambient temperature, it is possible to obtain the hardened molded article molded into the desired shape.

As described above, the present invention makes it possible to mold a plant into a desired shape, without reducing a plant material into powder and without using an adhesive.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention makes it possible to mold into a desired shape that piece of a plant (e.g., a wood) which has been disposed as waste, without a process of reducing the piece of the plant into powder and without an adhesive. Therefore, the present invention is applicable to, e.g., processes for manufacturing various wooden products such as containers, ornaments, and parts.

The invention claimed is:

1. A method for processing a plant, comprising the steps of:

(a) liquid-fluidizing a piece of a plant containing moisture by applying a pressure and a heat to the piece of the plant in a hermetically-closed state in a forming mold while retaining the moisture contained in the piece of the plant by substantially disabling ventilation of water vapor between an atmosphere inside the forming mold and an atmosphere outside the forming mold, the piece of the plant not having been reduced to a powder;

(b) pressure-molding the piece of the plant having the liquid fluidity into a molded article having a predetermined shape while in the hermetically-closed state;

(c) removing, by ending the hermetically-closed state, moisture contained in the molded article made from the piece of the plant; and (d) restoring an ambient pressure and an ambient temperature after the step (c) is carried out, thereby yielding the molded article, wherein the moisture content of the piece of the plant is not less than 10% by weight, and a pressure of 100 MPa or greater is applied to the piece of the plant while heating the piece of the plant to a temperature not less than 130° C. but not more than 200° C.

2. A method for processing a plant, comprising:

a first step including setting, inside a forming mold, a piece of a plant which contains moisture and which has not been reduced to a powder, hermetically closing the forming mold by substantially disabling ventilation of water vapor between an atmosphere inside the forming mold and an atmosphere outside the forming mold, and applying a heat and a pressure to the piece of the plant so as to liquid-fluidize the piece of the plant, and pressure-molding the piece of the plant thus liquid-fluidized while in the hermetically-closed state;

a second step of, after the piece of the plant reaches a predetermined molding temperature and a predetermined molding pressure, enabling ventilation of water vapor between the atmosphere inside the forming mold and the atmosphere outside the forming mold and thereby removing moisture from a molded article made from the piece of the plant; and a third step including retaining the predetermined molding pressure and the predetermined molding temperature for a predetermined period;

cooling the molded article thus made from the piece of the plant; and taking out the molded article from the forming mold, wherein the moisture content of the piece of the plant is not less than 10% by weight, and a pressure of 100 MPa or greater is applied to the piece of the plant while heating the piece of the plant to a temperature not less than 130° C. by not more than 200° C.

3. The method for processing a plant as set forth in claim 1, wherein the piece of the plant is a piece of wood.

4. The method for processing a plant as set forth in claim 2, wherein the piece of the plant is a piece of wood.

5. The method for processing a plant as set forth in claim 1, wherein the piece of the plant is a single piece of wood.

6. The method for processing a plant as set forth in claim 2, wherein the piece of the plant is a single piece of wood.

* * * * *